United States Patent [19]

Martinengo et al.

[11] 4,351,787

[45] Sep. 28, 1982

[54] PROCESS FOR SINTERING REACTION BONDED SILICON NITRIDE

[75] Inventors: PierCarlo Martinengo; Angelo Giachello; Giuseppe Tommasini, all of Turin, Italy; Paul Popper, Newcastle, England

[73] Assignee: Fiat Societa per Azioni, Turin, Italy

[21] Appl. No.: 970,594

[22] Filed: Dec. 18, 1978

[30] Foreign Application Priority Data

Dec. 23, 1977 [IT] Italy ............................... 69900 A/77

[51] Int. Cl.$^3$ .............................................. C04B 35/58
[52] U.S. Cl. ........................................ 264/65; 204/66; 501/154
[58] Field of Search ..................... 265/65, 66; 106/73.5

[56] References Cited

U.S. PATENT DOCUMENTS

| | | | |
|---|---|---|---|
| 3,206,318 | 9/1965 | Yamauchi et al. ..................... | 264/65 |
| 4,017,319 | 4/1977 | Greskovich ........................... | 264/66 |
| 4,119,690 | 10/1978 | Prochazka et al. ................. | 106/73.5 |
| 4,127,630 | 11/1978 | Washburn .............................. | 264/65 |

FOREIGN PATENT DOCUMENTS

| | | | |
|---|---|---|---|
| 938776 | 12/1973 | Canada ................................... | 264/65 |
| 1393579 | 5/1975 | United Kingdom ................ | 264/332 |

OTHER PUBLICATIONS

Boyer et al., "A Mechanism for the Nitridation of Fe--Contaminated Silican", *J. Materials Science*, 13 (1938), p. 1637–1646.

*Primary Examiner*—John A. Parrish
*Attorney, Agent, or Firm*—Sughrue, Mion, Zinn, Macpeak & Seas

[57] ABSTRACT

Sintered silicon nitride articles are prepared from a silicon nitride compact by forming a silicon powder containing one or more sintering additives for silicon nitride into a compact having at density of at least 1.3 g/cm$^3$, said additives being present in the powder in an amount such as to ensure an additive content of from 0.5 to 20 wt. % in the silicon nitride compact, nitriding the silicon compact by heating under nitrogen gas blanket at a temperature not exceeding 1500° C., to convert said silicon into reaction bonded silicon nitride, and sintering the reaction bonded silicon nitride compact by heating in a nitrogen gas atmosphere at a temperature of at least 1500° C.

13 Claims, No Drawings

PROCESS FOR SINTERING REACTION BONDED SILICON NITRIDE

The present invention relates to a process for sintering reaction bonded silicon nitride.

Silicon nitride is currently considered, among ceramic materials, to be that with the most interesting prospects for use in the manufacture of structural components for heat engines, i.e., gas turbines.

The processes which are at present in use for forming objects from silicon nitride are those of reaction bonding and hot pressing.

The first of these allows components of any complexity to be made by the known methods of the ceramics industry (slip casting, injection moulding etc.) but produces materials of low density (about 80% of the theoretical value), the presence of residual porosity resulting in limited mechanical properties and poor resistance to corrosion and erosion.

The material obtainable by not pressing is decidedly better in both these respects, but articles of complex shapes are not readily obtained by this method, which has, moreover, limited production capability.

In order to satisfy the need for making various complex components of high density and with high mechanical resistance, sintering of compacted silicon nitride powder would appear to offer the most interesting prospects.

However, silicon nitride is a compound which is very difficult to sinter because of the covalent nature of its bonding, and because of its thermal instability at the sintering temperatures. The sintering may be improved by increasing the "green" or starting density of the compact. However, green densities higher than 2.1 g/cm$^3$ an difficult to achieve. It is also possible to use very fine powders, but in this case the green density is low. Finally, since silicon nitride is not readily sinterable in the pure state, additives have been used in the art to promote sintering, usually by liquid phase formation. Reference is made in this connection to G. E. GAZZA, Sintered Silicon Nitride, Ceramics for High Performance Applications II, Proceedings of the Fifth Army Materials Technology Conference, Newport, Mar. 21-25, 1977, Editors J. J. Burke, E. N. Lenoe and R. N. Katz, published by the Metals and Ceramics Information Center, Colombus, Ohio. Conventional sintering additives are usually chosen from oxides, such as MgO, $Y_2O_3$, $CeO_2$, BeO and $ZrO_2$, rare earth based additions, spinel and non-oxide additions, such as $Mg_3N_2$, AlN and $Mg_2Si$, as shown in the above publication.

All these expedients have given only partial results, even when sintering is carried out in a nitrogen atmosphere under pressure (>20 Atm.).

The object of the present invention is to produce sintered articles of high strength and density, by using reaction bonded silicon nitride compacts, and thus a material of particularly high green density.

Thus, the invention provides a process for preparing a sintered silicon nitride article from a silicon nitride compact, which comprises the steps of:

forming a silicon powder containing one or more sintering additives for silicon nitride into a compact having a density of at least 1.3 g/cm$^3$, said additives being present in the powder in an amount such as to ensure an additive content of from 0.5 to 20 wt.% in the silicon nitride compact;

nitriding the silicon compact by heating under nitrogen gas blanket at a temperature not exceeding 1500° C., to convert said silicon into reaction bonded silicon nitride, and sintering the reaction bonded silicon nitride compact by heating in a nitrogen gas atmosphere at a temperature of at least 1500° C.

As is known in the art, reaction bonded silicon nitride compacts are prepared by forming silicon powder into a compact of the desired shape and density, and nitriding the compact with consequent increase in density without substantial dimensional change, and formation of a reaction bonded material. Reference is made in this connection to R. W. OHNSORG, Reaction Bonded $Si_3N_4$, Preparation and Properties, the American Ceramic Society Spring Meeting, Washington, D.C., May 9, 1972, and F. L. RILEY, Nitridation and Reaction Bonding, Nitrogen Ceramics, Noordhoff International Publishing, Leyden, The Netherlands, 1977.

The reaction bonded $Si_3N_4$ compacts of the process of the invention may be prepared by any of the known methods. In particular, the silicon powder generally has a particle size of from 0.1 to 44μ, best results being generally obtained with low sizes. According to the known art, silicon power of high purity or containing only very small amounts of nitriding catalysts should be used. According to the invention, sintering additives for silicon nitride are added to the silicon powder in an amount such as to ensure in the reaction bonded material an additive content of from 0.5 to 20% by weight, and preferably from 1 to 15% by weight, best results being generally obtained with contents of 3-10% by weight. Any of the conventional sintering additives may be used for the purpose. Preferred additives are MgO, $Y_2O_3$, $CeO_2$, $ZrO_2$, BeO, $Mg_3N_2$ and AlN. Other examples of additives are $Mg_2Si$, $MgAl_2O_4$ and rare earth additions such as $La_2O_3$. Although not being classified among the conventional additives Fe can also be used with advantage, usually in mixture with conventional additives such as MgO, $Y_2O_3$ and $CeO_2$. Best results are generally obtained by using compacts containing MgO, and especially in mixture with $Y_2O_3$.

The silicon powder may be formed into a compact by any of the conventional methods, such as pressing and isopressing, vibration compaction (ramming), slip casting, extrusion and injection molding. In each case, the operating conditions should be such as to obtain a compact with a density of at least 1.3 g/cm$^3$ and preferably at least 1.5 g/cm$^3$.

The compact is then nitrided by operating according to known methods. Generally the nitriding temperature does not exceed about 1450° C. and the compact is gradually brought to the maximum nitriding temperature in a nitrogen atmosphere with periods of stay at intermediate temperatures. Thus, it is possible to use the conventional two-stage treatment at 1350° and 1450° C., nitriding times generally being about 16 to 32 hours at 1350° C. and 4 hours at 1450° C. to insure complete reaction. The reaction bonded material generally has a density of at least 2.2 g/cm$^3$, and typically of the order of 2.5-2.6 g/cm$^3$. Densities exceeding 2.7 g/cm$^3$ are difficult to achieve. This reaction bonded material is then submitted to sintering, thus obtaining a sintered article of improved strength and density, the final density being generally close to the theoretical value (3.18 g/cm$^3$).

The compact may be sintered by using conventional methods. The sintering temperature is generally from 1500° to 2000° C. and the sintering temperature from 0.5 to 6 hours. The sintering may be carried out in an autoclave at superatmospheric pressure (generally 10–1000 atm. and preferably 20–100 atm). In this case it is generally preferable to use high sintering temperatures (>1750° C.). The sintering may also be carried out at atmospheric pressure. The compact may be embedded in a protective powder of $Si_3N_4$, BN or mixtures of both. Pressureless sintering may also conveniently be carried out by using the method described in our copending application (F 2469).

The process of the invention will now be illustrated by the following non-limitative examples.

EXAMPLE 1

A mixture consisting of 90 wt.% silicon, with a maximum grain size of 44μ and average grain size of 5μ, 5 wt.% MgO and 5 wt.% $Y_2O_3$ is formed into cylinder (diameter=30 mm, h=45 mm, density=67% of the theoretical value) by means of cold isostatic pressing in rubber containers at a pressure of 2500 Kg/cm$^3$.

These samples are nitrided in a graphite resistance furnace in an atmosphere of flowing nitrogen (5 l/min.) for a period of 100 hours, the temperature being gradually brought from 1100° to 1390° C. with periods of stay at intermediate temperatures.

The material thus obtained has a density of 2.55–2.6 g/cm$^3$ (80% of the theoretical value) with $Si_3N_4$ predominantly in the α form (>80%).

The samples are submitted to a sintering treatment at 1800° C. for times variable from 1 to 3 hours in a graphite container, using a protective powder with the following composition by weight: 60% $Si_3N_4$, 30% BN, 5% MgO and 5% Fe.

Once the sample is embedded in the powder, vacuum is applied ($10^{-3}$ Torr) while the temperature is brought to 1100° C., and nitrogen is then passed and the pressure brought to 500 Torr. The temperature is then gradually brought to 1800° C. while bringing the pressure to 750 Torr. The sintered sample is cooled in a nitrogen atmosphere.

The samples this sintered have the following properties.

| density | 2.95–3.1 g/cm$^3$ |
| --- | --- |
| X-ray analysis | $\beta Si_3N_4$ |
| | traces of silicates and oxo-nitrogen compounds |
| porosity | <8% |
| bending strength (25° C.) | 55–65 Kg/mm$^2$ |

EXAMPLE 2

Samples of reaction bonded silicon nitride having the same density, structure and size as in Example 1 are prepared by the same procedure as in Example 1 from a silicon powder containing 5 wt.% of MgO and 2 wt.% of Fe.

Using the same procedure as in Example 1, the samples are sintered at 1700°–1800° C. for times of from 1 to 3 hours, using a protective powder with the following composition by weight: 50% $Si_3N_4$, 45% BN and 5% MgO. The sintered samples thus obtained have the following properties

| density | 2.85–2.95 g/cm$^3$ |
| --- | --- |
| X-ray analysis | $\beta Si_3N_4$ |
| | traces of silicates and oxo-nitrogen compounds |
| porosity | <10% |
| bending strength (25° C.) | 45–55 Kg/mm$^2$ |

EXAMPLE 3

Samples of reaction bonded silicon nitride having the same density, structure and size as in Example 1 are prepared by the same procedure as in Example 1 from a silicon powder containing 5% by weight of $Y_2O_3$ and 2% by weight of Fe.

Using the same procedure as in Example 1, the samples are sintered at 1800° C. for 2 hours, using a protective powder with the following composition by weight: 50% $Si_3N_4$, 40% BN, 5% MgO and 5% $Y_2O_3$. The sintered samples have the following properties.

| density | 3.05 g/cm$^3$ |
| --- | --- |
| X-ray analysis | $\beta Si_3N_4$ |
| | traces of silicates and oxo-nitrogen compounds |
| porosity | <5% |
| bending strength (25° C.) | 60 Kg/mm$^2$ |

EXAMPLE 4

Samples of reaction bonded silicon nitride having the same density, structure and size as in Example 1 are prepared by the same procedure as in Example 1 from a silicon powder containing 8 wt.% of $CeO_2$ and 2 wt.% of Fe.

Using the same procedure as in Example 1, the samples are sintered at 1800° C. for 2 hours, using a protective powder with the following composition by weight: 50% $Si_3N_4$, 40% BN, 5% MgO and 5% $CeO_2$.

The sintered samples have the following properties.

| density | 2.9 g/cm$^3$ |
| --- | --- |
| X-ray analysis | $\beta Si_3N_4$ |
| | traces of silicates and oxo-nitrogen compounds. |
| porosity | <5% |
| bending strength (25° C.) | 50 Kg/mm$^2$ |

We claim:
1. A process for increasing the density of a reaction bonded silicon nitride article, which comprises the steps of:
  forming a silicon powder compact consisting essentially of silicon powder and one or more sintering additives for silicon nitride, the compact having a density of at least 1.3 g/cm$^3$, said additives being present in the silicon powder in an amount such as to ensure an additive content of from 0.5 to 20 wt.% in the silicon nitride compact wherein the sintering additives are selected from the group consisting of MgO, $Y_2O_3$, $CeO_2$ and mixtures thereof with Fe;
  nitriding the silicon compact by heating under nitrogen gas blanket at a temperature not exceeding 1500° C., to convert said silicon into reaction bonded silicon nitride, and sintering the reaction bonded silicon nitride compact by heating in a nitrogen gas atmosphere at a temperature of at least 1500° C., said sintering being in the substantial absence of mechanical pressure, whereby said density is increased.

2. The process of claim 1, wherein the silicon powder contains MgO as a sintering additive.

3. The process of claim 1, wherein the silicon powder contains MgO and $Y_2O_3$ as sintering additives.

4. The process of claim 1, wherein the silicon nitride compact contains from 1 to 15 wt.% of additives.

5. The process of claim 1, wherein the silicon powder has a particle size of from 0.1 to 44μ.

6. The process of claim 1, wherein the silicon compact has a density of at least 1.5 $g/cm^3$.

7. The process of claim 1, wherein the nitriding step is carried out at a temperature not exceeding 1450° C.

8. The process of claim 1, wherein the silicon nitride compact has a density of at least 2.2 $g/cm^3$.

9. The process of claim 1, wherein the sintering is carried out at a temperature of from 1500° C. to 2000° C.

10. The process of claim 1, wherein said one or more sintering additives for silicon nitride are present in an amount of from 3 to 10 wt.% in the silicon nitride compact.

11. The process according to claim 10, wherein nitriding is conducted at a temperature not exceeding 1450° C. and sintering is conducted at a temperature of 1500° C. to 2000° C.

12. The process according to claim 11, wherein said reaction bonded silicon nitride has a density of 2.5 to 2.6 $g/cm^3$ and said sintered reaction bonded silicon nitride compact has a density of at least 2.85 $g/cm^3$.

13. The process of claim 1, wherein the sintering is carried out while the nitrided silicon compact is embedded in a protective powder comprising $Si_3N_4$, BN and MgO.

* * * * *